United States Patent
Skov et al.

(10) Patent No.: US 9,635,653 B2
(45) Date of Patent: Apr. 25, 2017

(54) SWITCHING BETWEEN DOWNLINK AND UPLINK

(75) Inventors: Peter Skov, Beijing (CN); Li Zhang, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 62 days.

(21) Appl. No.: 14/396,876

(22) PCT Filed: Apr. 26, 2012

(86) PCT No.: PCT/CN2012/074726
§ 371 (c)(1),
(2), (4) Date: Oct. 24, 2014

(87) PCT Pub. No.: WO2013/159304
PCT Pub. Date: Oct. 31, 2013

(65) Prior Publication Data
US 2015/0103704 A1  Apr. 16, 2015

(51) Int. Cl.
| | |
|---|---|
| *H04L 5/14* | (2006.01) |
| *H04W 72/04* | (2009.01) |
| *H04B 7/26* | (2006.01) |
| *H04L 5/00* | (2006.01) |
| *H04L 1/18* | (2006.01) |

(52) U.S. Cl.
CPC ...... *H04W 72/0413* (2013.01); *H04B 7/2656* (2013.01); *H04L 5/0053* (2013.01); *H04L 5/14* (2013.01); *H04L 5/1469* (2013.01); *H04W 72/0446* (2013.01); *H04L 1/1887* (2013.01)

(58) Field of Classification Search
CPC .......... H04W 72/0413; H04W 72/0446; H04B 7/2656; H04L 5/14; H04L 1/1887; H04L 1/1812
See application file for complete search history.

(56) References Cited

U.S. PATENT DOCUMENTS

| | | | |
|---|---|---|---|
| 9,197,683 B2 * | 11/2015 | Fwu | H04W 72/085 |
| 2010/0246456 A1 * | 9/2010 | Suo | H04W 56/003 370/280 |
| 2011/0211503 A1 * | 9/2011 | Che | H04L 5/0005 370/280 |

(Continued)

FOREIGN PATENT DOCUMENTS

| | | |
|---|---|---|
| CN | 101262322 A | 9/2008 |
| CN | 101425845 A | 5/2009 |

(Continued)

OTHER PUBLICATIONS

ETSI TS 136 211 V10.4.0 (Jan. 2012); LTE; Evolved Universal Terrestrial Radio Access (E-UTRA); Physical channels and modulation (3GPP TS 36.211 version 10.4.0 Release 10).

(Continued)

*Primary Examiner* — Jay P Patel
(74) *Attorney, Agent, or Firm* — Harrington & Smith

(57) ABSTRACT

Communications of a time division duplex radio frame provided with at least one special subframe including at least one pilot period is provided such that at least one special subframe is used for signalling of critical control information. Other subframes of the radio frame than the at least one special subframe are flexibly allocated for use as downlink and uplink subframes of the radio frame.

15 Claims, 3 Drawing Sheets

(56) References Cited

U.S. PATENT DOCUMENTS

| | | | |
|---|---|---|---|
| 2012/0020256 A1 | 1/2012 | Tujkovic et al. ............. 370/278 |
| 2013/0083736 A1* | 4/2013 | Yin .................... H04W 72/0446 |
| | | | 370/329 |
| 2013/0083753 A1* | 4/2013 | Lee .................... H04W 72/0453 |
| | | | 370/329 |
| 2013/0176952 A1* | 7/2013 | Shin ........................ H04L 5/001 |
| | | | 370/329 |
| 2013/0336177 A1* | 12/2013 | Gao .................. H04W 72/0446 |
| | | | 370/280 |
| 2014/0161003 A1* | 6/2014 | Han .................... H04W 52/146 |
| | | | 370/280 |
| 2015/0043392 A1* | 2/2015 | Susitaival ............. H04L 5/1469 |
| | | | 370/280 |
| 2015/0078220 A1* | 3/2015 | Hu ........................ H04W 24/08 |
| | | | 370/280 |
| 2015/0236804 A1* | 8/2015 | Lindoff ................ H04B 17/318 |
| | | | 370/328 |

FOREIGN PATENT DOCUMENTS

| | | |
|---|---|---|
| CN | 102415014 A | 4/2012 |
| EP | 2648444 A1 | 10/2013 |
| EP | 2648446 A1 | 10/2013 |

OTHER PUBLICATIONS

3GPP TS 36.211 V10.4.0 (Dec. 2011), "3$^{rd}$ Generation Partnership Project; Technical Specification Group Radio Access Network; Evolved Universal Terrestrial Radio Access (E-UTRA); Physical Channels and Modulation (Release 10)", 101 pgs.

\* cited by examiner

SWITCHING BETWEEN DOWNLINK AND UPLINK

This disclosure e application relates to wireless communications and more particularly to switching between downlink and uplink subframes.

A wireless communication system can be seen as a facility that enables wireless carriers between two or more nodes such as fixed or mobile communication devices, access points such as base stations, servers and so on. A communication system and compatible communicating devices typically operate in accordance with a given standard or specification which sets out what the various entities associated with the system are permitted to do and how that should be achieved. For example, the standards, specifications and related protocols can define the manner how and what communication devices shall communicate, how various aspects of the communications shall be implemented and how the devices shall be configured. Examples of wireless systems include public land mobile networks (PLMN) such as cellular networks, satellite based communication systems and different wireless local networks, for example wireless local area networks (WLAN). Wireless systems can be divided into coverage areas referred to as cells. Different types of cells can provide different features. For example, cells can have different shapes, sizes, power levels and other characteristics. FIG. 1 shows a schematic example of a system comprising two base stations and tow devices in communication with the base stations.

A user can access the communication system by means of an appropriate communication device. A communication device of a user is often referred to as user equipment (UE) or terminal. A communication device is provided with an appropriate signal receiving and transmitting arrangement for enabling communications with other parties. Wireless systems enable mobility for users where a mobile device can communicate over an air interface with another communication device such as e.g. a base station and/or other user equipment.

Examples of mobile communication systems are those based on standards by the 3rd Generation Partnership Project (3GPP). A recent 3GPP development is often referred to as the long-term evolution (LTE) of the Universal Mobile Telecommunications System (UMTS) radio-access technology. The various development stages of the 3GPP LTE specifications are referred to as releases. In LTE base stations are commonly referred to as enhanced NodeBs (eNB).

LTE provides frequency division duplex (FDD) and time division duplex (TDD) modes for wireless communications. In LTE TDD physical layer the uplink and downlink are divided into 10 ms long radio frames. FIG. 2 illustrates a radio frame structure 20 for LTE time division duplex (TDD). A LTE TDD radio frame is divided into timeslots where two consecutive slots form one subframe. Thus each frame can be understood as being divided into ten 1 ms subframes #0-#9. Within a radio frame, LTE TDD can switch multiple times between downlink and uplink transmission and vice versa. However, uplink (UL) transmission may interfere with the downlink (DL) and vice versa. An example for UL-DL interference is shown in FIG. 1 (note that carriers C1 and C2 can comprise a single carrier). Such interference can be an important limiting factor to flexible UL/DL allocation. Critical control information, non-limiting examples of which include secondary synchronization signal (SSS), physical broadcast channel (PBCH), system information, paging information, and random access channel (RACH) response message transmitted over PDSCH with DL grant on PDCCH, common reference signal (CSR) and/or channel state information reference signal (CSI-RS), UL control information transmitted on PUCCH/PUSCH and dynamic broadcast channel (BCH) carrying system information blocks (SIBs) can become exposed to severe interference if one or more neighbouring cells is/are in opposite direction in the same subframe.

In general, loss of critical control information may even prevent the whole system from working. To ensure reliability control information should be communicated in a time period when neighbouring cells have the same UL/DL direction. This is known as a protected time period.

Communication in radio frames can be switched between uplink and downlink subframes. Switching from the downlink to the uplink can be provided on a subframe commonly referred to as a special subframe, denoted by S in FIG. 2. A special subframe comprises Downlink Pilot Timeslot (DwPTS) 22 and Uplink Pilot Timeslot (UpPTS) 24 fields. A guard period (GP) 23 is provided between the downlink and uplink pilots.

FIG. 2 shows one predefined UL/DL switching configuration. Currently there are seven different UL/DL switching configurations specified in 3GPP TS 36.211 version 10.4.0. A cell specific UL/DL configuration is broadcasted in system information block 2 (SIB-2). This configuration can be changed with a minimum periodicity of 640 ms. Flexible UL/DL allocation for time division duplexing (TDD) would be desired. The inventors have recognised that more efficient resource utilization might be obtained if the ratio between UL and DL subframes could be adjusted in a more flexible manner and/or faster than what is currently supported for example in LTE Releases 8/9/10. The inventors have also found that advantage in view of latency reduction might be expected from flexible UL/DL allocation. The round trip time (RTT) in TDD is hard-coded with UL/DL configuration, and varies from subframe to subframe. To allow hybrid automatic repeat request acknowledgement (HARQ-ACK) feedback and HARQ re-transmission to take place in the earliest possible subframe, it can be beneficial if as many as possible, preferably all or at least most, of the subframes could be flexibly set as DL or UL in a fast manner.

In current control channel arrangements for TDD almost all critical control channels are placed in subframes #0, #1 and #2. Therefore it has been proposed that the three first subframes are protected. A consequence of this is that the transmission order of these subframes is fixed to D-S-U (downlink-special subframe-uplink). This pattern cannot be changed flexibly. This imposes a substantial limitation on the flexibility of UL/DL allocation as it fixes the allocation of 60% of the resources.

It is noted that the above discussed issues are not limited to any particular communication environment and station apparatus but may occur in any appropriate system where cells are selected by mobile devices.

Embodiments of the invention aim to address one or several of the above issues.

In accordance with an embodiment there is provided a method for communications of a time division duplex radio frame provided with at least one special subframe comprising at least one pilot period, the method comprising using the at least one special subframe for signalling of critical control information, and flexibly allocating other subframes of the radio frame than the at least one special subframe for use as downlink and uplink subframes of the radio frame.

In accordance with an embodiment there is provided an apparatus for controlling communications of a time division duplex radio frame provided with at least one special subframe comprising at least one pilot period, the apparatus comprising at least one processor, and at least one memory including computer program code, wherein the at least one memory and the computer program code are configured, with the at least one processor, to use the at least one special subframe for signalling of critical control information, and flexibly allocate other subframes of the radio frame than the at least one special subframe for use as downlink and uplink subframes of the radio frame.

In accordance with a more detailed embodiment a fixed ratio of time periods for a downlink pilot, a guard period and an uplink pilot of the special subframe is used. The ratio between the downlink pilot period, the guard period and the uplink pilot period can be fixed at 6:1:7 or 7:1:6.

A physical uplink shared channel and/or a physical uplink control channel can be transmitted in a pilot timeslot of the at least one special subframe.

Critical control information may comprise any information critical for the operation of the system, for example at least one of a secondary synchronization signal, a physical broadcast channel, a common reference signal, a channel state information reference signal and radio resource control information.

Timing of feedback information and/or grant information associated with a special subframe can be arranged to coincide with another special subframe.

Uplink and/or downlink subframes can be allocated until a subsequent other special subframe.

All critical control information may be signalled in the at least one special subframe.

An enhanced node B or a mobile station arranged to implement the embodiments may be provided.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of wireless communications are briefly explained with reference to FIGS. 1 to 3 to assist in understanding the technology underlying the described examples.

A non-limiting example of the recent developments in communication system architectures is the long-term evolution (LIE) of the Universal Mobile Telecommunications System (UMTS) standardized by the 3rd Generation Partnership Project (3GPP). More recent development of the LTE, Release 10 and upwards, are sometimes referred to as LTE-Advanced. The LTE employs a mobile architecture known as the Evolved Universal Terrestrial Radio Access Network (E-UTRAN). Base stations of such systems are known as evolved or enhanced Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the communication devices. Other examples of radio access system include those provided by base stations of systems that are based on technologies such as wireless local area network (WLAN) and/or WiMax (Worldwide Interoperability for Microwave Access).

Figure 1:
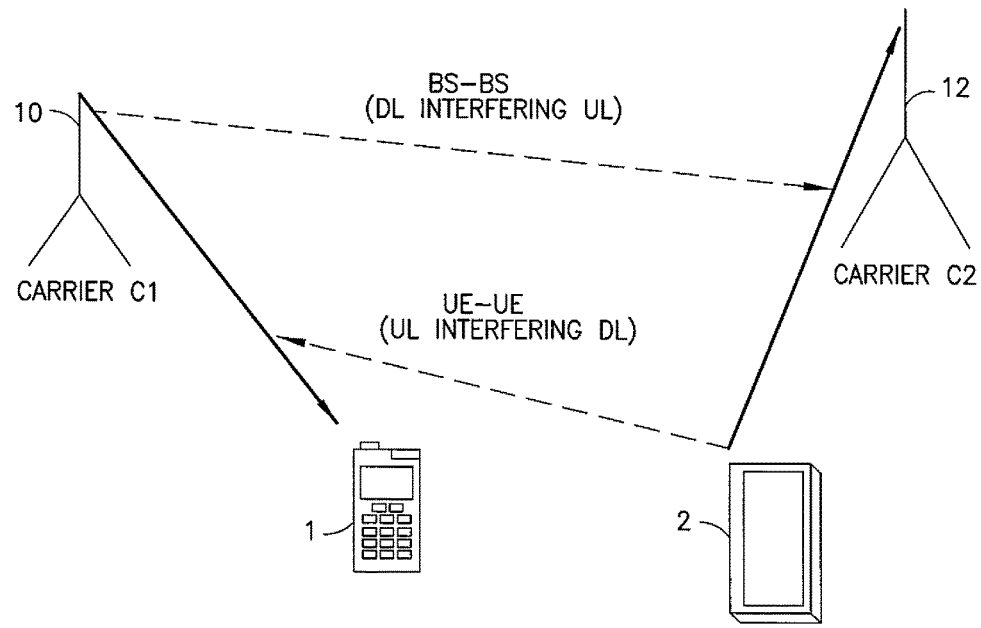
FIG. 1 shows a schematic diagram of a communication system where the invention may be embodied.

Mobile communication devices 1 and 2 can be provided with wireless access via base stations or similar wireless transmitter and/or receiver nodes providing radio service areas or cells. The base stations are typically connected to a wider communications network via appropriate gateways. FIG. 1 shows two bases stations 10 and 12. A mobile communication device may be located in the service areas of different cells, communicate with more than one cell and be handed over from a cell to another. The base station nodes can be connected to a core communications network via appropriate gateways and/or backhaul systems. It is noted that the base stations and mobile devices are only schematically shown for illustration purposes in FIG. 1, and that the number and type of these can vary considerably from that shown.

Figure 3:
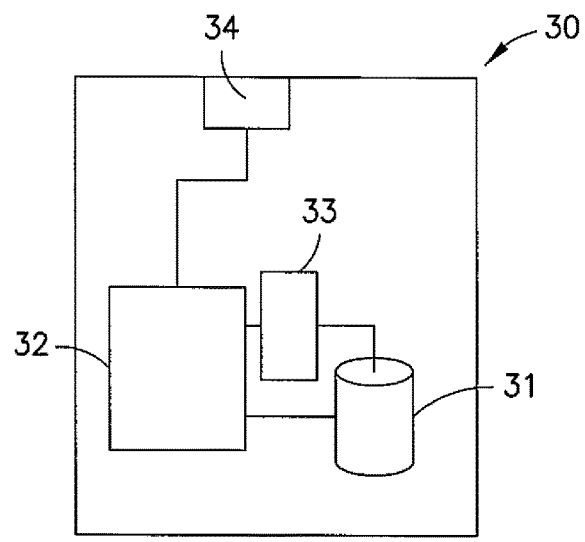
FIG. 3 shows a schematic diagram of a control apparatus according to some embodiments.

Base stations are typically controlled by at least one appropriate controller apparatus so as to enable operation thereof and management of mobile communication devices in communication with the base stations. The control apparatus can be interconnected with other control entities. FIG. 3 shows an example of a control apparatus capable of operating in accordance with the embodiments, for example to be coupled to and/or for controlling a base station. The control apparatus 30 can be arranged to provide control on communications in the service area of a cell. In some embodiments a base station can comprise a separate control apparatus. In other embodiments the control apparatus can be another network element. The control apparatus 30 can be configured to provide control functions in association with generation and communication of radio frames and necessary information for enabling flexible switching and/or allocation of radio resources for communications between the base station and mobile devices. The control functions are provided by means of a data processing facility in accordance with certain embodiments described below. For this purpose the control apparatus can comprise at least one memory 31, at least one data processing unit 32, 33 and an input/output interface 34. The control apparatus can be coupled to a receiver and/or transmitter of the base station via the interface. The control apparatus can be configured to execute an appropriate software code to provide the control functions. The control apparatus and functions may be distributed between a plurality of control units. In some embodiments, each base station can comprise a control apparatus. In alternative embodiments, two or more base stations may share a control apparatus.

A possible mobile device for communications with the base stations is often referred to as user equipment (UE) or terminal. An appropriate mobile device may be provided by any device capable of sending radio signals to and/or receiving radio signals from multiple cells. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile device may provide, for example, communication of data for carrying communications such as voice, electronic mail (email), text message, multimedia and so on. Users may thus be offered and provided numerous services via their devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information. The mobile device may receive and transmit signals over an air interface with multiple base stations via an appropriate transceiver apparatus.

A wireless communication device, such as a base station and/or a mobile station, can be provided with a Multiple Input/Multiple Output (MIMO) antenna system for enabling multi-flow communications. MIMO arrangements as such are known. MIMO systems use multiple antennas at the transmitter and receiver along with advanced digital signal processing to improve link quality and capacity. More data can be received and/or sent where there are more antenna elements.

Figure 2:
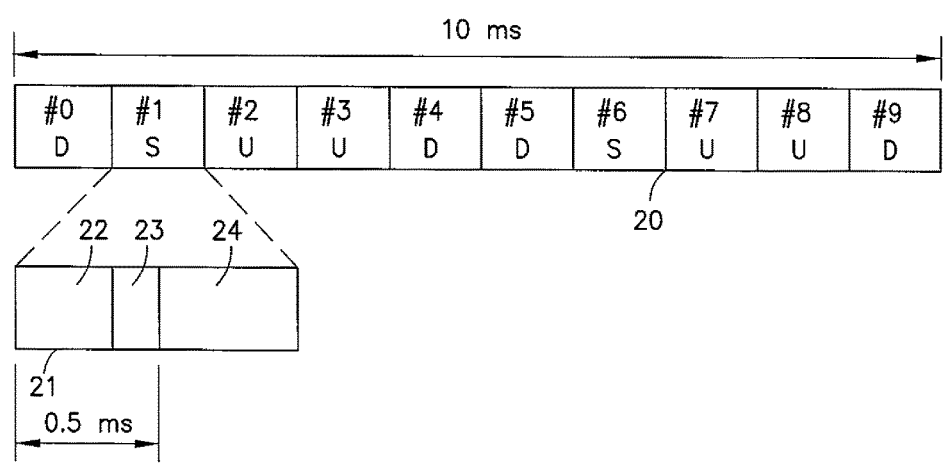
FIG. 2 shows a radio frame.

FIG. 2 illustrates a radio frame structure 20 for LTE time division duplex (TDD). In this example the switching between the subframes follows existing LTE UL/DL configuration 1. In LTE TDD physical layer the uplink and downlink are divided into 10 ms long radio frames. A LTE TDD radio frame is further divided into 0.5 ms timeslots, two consecutive slots forming one subframe. Thus each frame 20 is divided into ten 1 ms subframes #0-#9. Each frame can comprise at least one subframe 21 containing special fields known as downlink pilot time slot (DwPTS) 22, guard period (GP) 23 and uplink pilot time slot (UpPTS) 24. Such a subframe is commonly referred to as a special subframe. The special subframes of frame 20 are located at subframes #1 and #6 and are denoted by S. The special subframe has been defined e.g. for in LTE Release 8. According to LTE specifications the fields of a special subframe can have nine different configurations. The lengths of the individual fields 22, 23 and 24 in a special subframe can depend on the uplink/downlink configuration selected by the network. The total length of the three fields in a LTE special frame remains constant at 1 ms.

A process known as timing advance is provided to prevent conflicts when switching from the uplink to the downlink transmission. When switching from the downlink to the uplink, a guard period (GP) 23 is inserted between Downlink Pilot Timeslot (DwPTS) 22 and Uplink Pilot Timeslot (UpPTS) 24 fields. The duration of the GP 23 can depend on various factors, for example the signal propagation time from a base station to mobile device and back as well as on the time the mobile device requires to switch from receiving to sending.

In accordance with an embodiment the special subframe 20 is used to provide flexible uplink/downlink (UL/DL) allocation for transmission of time division duplex (TDD) radio frames. In the embodiment all critical control information such as control channels/signals is transmitted in a protected special subframe of a TDD radio frame whilst the other subframes, e.g. subframes #0 and #2 in FIG. 2 would not be protected and could thus be flexibly allocated.

Figure 4:
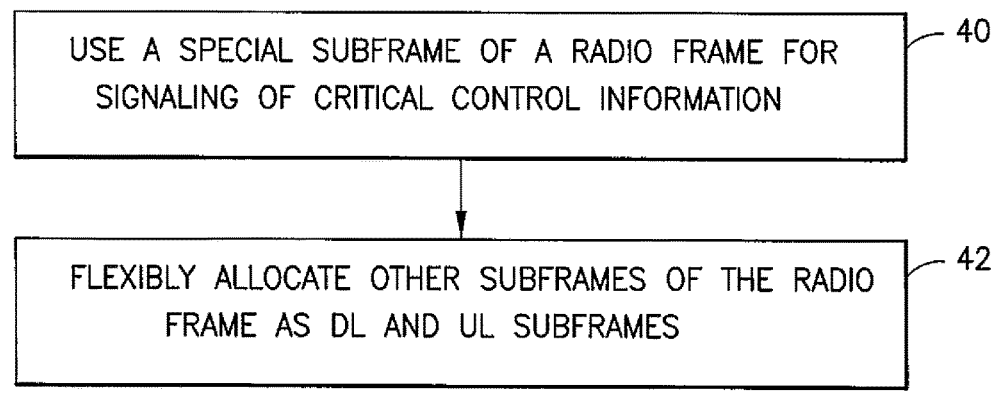
FIG. 4 shows a flowchart according to certain embodiment.

FIG. 4 shows a method for communications of TDD radio frames, and more particularly for allocation of downlink and uplink subframes in an arrangement where at least one special subframe containing at least one pilot period is provided in the radio frame. In accordance with an embodiment the special subframe comprises time for downlink and uplink pilots and for a guard period between the downlink and uplink pilot periods. Critical control information is signalled at 40 in the at least one special subframe. The other subframes can be flexibly allocated at 42 for use as downlink or uplink subframes. The special subframe or special subframes of the radio frame can provide switching points and subframes that are the sole protected subframes of the radio frame, thus providing flexibility in use of the other subframes. All critical control information can be included in the special subframe. Non-critical control information may nevertheless be sent in other, non-protected subframes.

A base station, for example an eNB and a mobile device can be adapted to be capable of processing the critical information in the special subframe, for example to transmit and/or receive the critical information in the special subframe.

Figure 5:
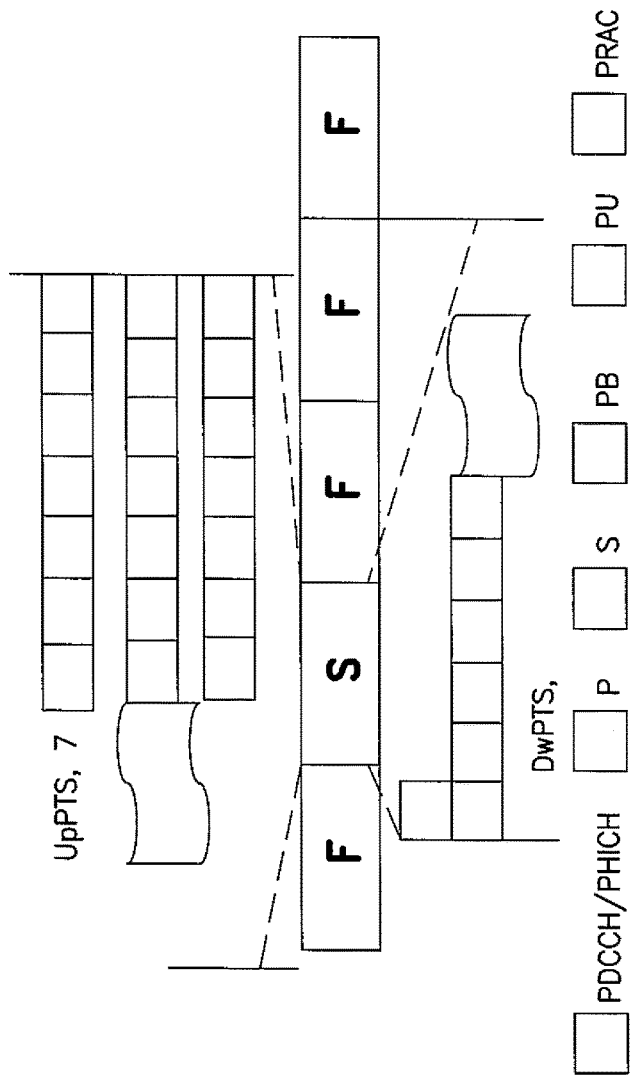
FIG. 5 shows use of a special subframe for certain critical control signals.

Critical control information can be any information missing of which would prevent access and/or reduce the reliability and/or robustness of communications. The critical control information can include information such as the secondary synchronization signal (SSS), physical broadcast channel (PBCH), common reference signal (CSR) and/or channel state information reference signal (CSI-RS). Certain non-limiting examples of placement of certain critical information, in this example PSS/SSS/PBCH, in a special subframe is shown in FIG. 5. Thus, instead of transmitting information such as the SSS/PBCH/CRS/CSI-RS in subframe #0 of FIG. 2 this can be communicated in the special subframe 21 (subframe #1) providing pilot timeslots 22 and 24.

In accordance with an embodiment transmission of a physical downlink control channel (PUCCH) and/or physical downlink shared channel (PUSCH) in Uplink Pilot Timeslot (UpPTS) is allowed.

In accordance with a further embodiment a fixed special subframe configuration with guard period (GP) length of 1 LTE orthogonal frequency-division multiplexing (OFDM) symbol can be used. This is possible since the relevant propagation delays are small compared to the length of one LTE OFDM symbol. Furthermore special subframe configurations which assign similar amount of resources for downlink pilot time slot (DwPTS), and uplink pilot time slot (UpPTS) can be prioritized, e.g. in relation 6:1:7 or 7:1:6.

Specific timing may be provided for the special subframe. The special subframe can be arranged to be the only protected subframe. With such special subframe design it is possible to support efficient communication between a base station and mobile device(s) without relying on any other subframes. This can be used to ensure robust system operation even if other subframes are unusable due to interference between uplink and downlink time slots as the special subframe can nevertheless be used for example for signalling of important radio resource control (RRC) information.

Figure 6:
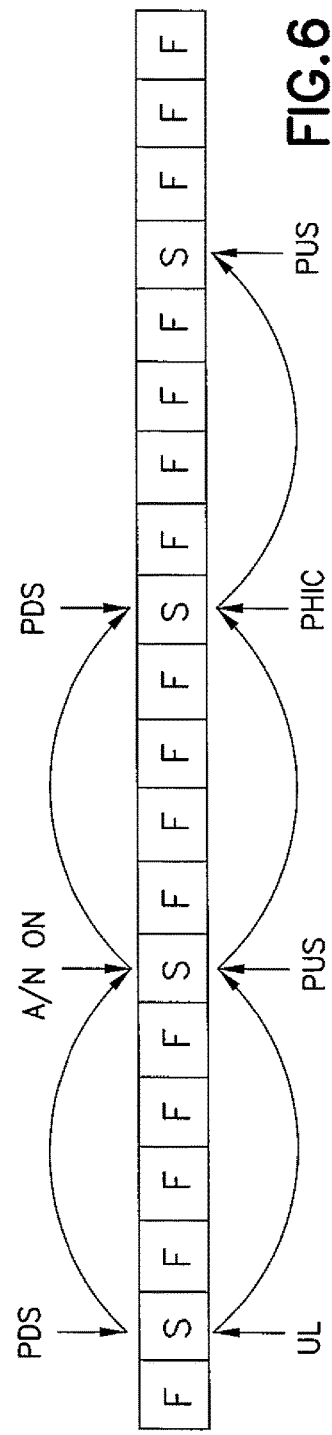
FIG. 6 shows timing of information associated with critical information in a special subframe.

A specific timing can be defined so that the shared channels in special subframe always have their hybrid automatic repeat request acknowledgement (HARQ-ACK) feedback and grant in another special subframe. Certain examples of such timings are illustrated in FIG. 6. The round trip time (RTT) for PUSCH/PDSCH in special subframe can be fixed for example to 10 ms.

Information of UL/DL allocation of subframes until the next special subframe can be provided in a special subframe. This can be provided to achieve a flexible UL/DL allocation in a manner that is between a pure dynamic allocation and semi-static allocation. UL/DL allocation of time slots until the next special subframe can be provided by a new physical channel transmitted in the special subframe.

Other subframes than a special subframe can be flexibly used for the UL or DL. The number of subframe boundaries where D to U switching is allowed can be increased, for example for an UE adapted to operate with truncated PDSCH.

Enhanced Physical Downlink Control Channel (ePDCCH) can be protected by muting PUSCH transmission in neighbour cells on ePDCCH physical resource blocks (PRBs).

Timing relation between Physical Downlink Shared Channel (PDSCH) and the HARQ-ACK transmission on physical uplink control channel (PUCCH) or Physical Uplink Shared Channel (PUSCH) can be flexibly determined by using the first available UL resource allowed by processing delay. Currently the agreed processing delay is 3 ms, but in future reduced processing delays can be expected. Assuming that the uplink is supporting asynchronous HARQ, similar principles can be applied for uplink data transmissions on PUSCH. Latency reduction may be provided by reducing the length of the subframes to 0.5 ms. This can be provided since a DwPTS plus a guard period can be considered to provide a 0.5 ms-subframe while UpPTS can be considered as another 0.5 ms-subframe. This can be combined with a new HARQ timing scheme with reduced processing delays to reduce overall HARQ RTT.

The embodiment can provide more flexible UL/DL allocation in TDD by allowing flexible transmission in all subframes apart the special subframe(s). For example, the currently 3GPP solution can provide 20%-60% UL activity, while the embodiments can be used to provide activity level in the range of 0-80%. Flexibility in switching resources between uplink and downlink while maintaining a minimal set of resources for robust communication may be provided. Moreover, a smooth evolution of time division LTE (TD-LTE) emphasizing properties of time division-synchronous code division multiple access (TD-SCDMA) may be provided. A new short sub-frame length may be provided which can be used to achieve latency reduction.

It is noted that whilst embodiments have been described using LTE and LTE Advanced as examples, similar principles can be applied to any other communication system or indeed to further developments with LTE where TDD is employed. Thus, instead of LTE, the invention may be applied to other cellular standards as well. Also, instead of carriers provided by base stations at least one of the carriers may be provided by a communication device such as mobile user equipment. For example, this may be the case in application where no fixed equipment provided but a communication system is provided by means of a plurality of user equipment, for example in adhoc networks. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

What is claimed is:

1. A method for communications of a time division duplex radio frame provided with at least one special subframe comprising at least one pilot period, the method comprising:
   using the at least one special subframe for signalling of all critical control information, and
   flexibly allocating other subframes of the radio frame than the at least one special subframe for use as downlink and uplink subframes of the radio frame such that a ratio of time periods for a downlink pilot, a guard period and an uplink pilot of the special subframe is fixed at 6:1:7 or 7:1:6.

2. A method according to claim 1, comprising transmitting a physical uplink shared channel and/or a physical uplink control channel in an uplink pilot timeslot of the at least one special subframe.

3. A method according to claim 1, wherein the critical control information comprises at least one of a secondary synchronization signal, a physical broadcast channel, a common reference signal, a channel state information reference signal and radio resource control information.

4. A method according to claim 1, comprising configuring timing of feedback information and/or grant information associated with a special subframe to coincide with another special subframe.

5. A method according to claim 1, comprising allocating uplink and/or downlink subframes until a subsequent other special subframe.

6. The method according to claim 1, wherein the other subframes of the radio frame that are flexibly allocated include subframes of the radio frame that are adjacent to the at least one special subframe.

7. An apparatus comprising:
at least one processor; and
at least one memory including computer program code, the at least one memory and the computer program code configured, with the at least one processor, to cause the apparatus to perform at least the following:
to control communications of a time division duplex radio frame provided with at least one special subframe comprising at least one pilot period;
to use the at least one special subframe for signalling of all critical control information; and
to flexibly allocate other subframes of the radio frame than the at least one special subframe for use as downlink and uplink subframes of the radio frame such that a ratio of time periods for a downlink pilot, a guard period and an uplink pilot of the special subframe is fixed at 6:1:7 or 7:1:6.

8. An apparatus according to claim 7, wherein the special subframe comprises time periods for a downlink pilot, a guard period and an uplink pilot, the apparatus being configured for transmission of a physical uplink shared channel and/or a physical uplink control channel in one of the pilot time periods.

9. An apparatus according to claim 7, wherein the critical control information comprises at least one of a secondary synchronization signal, a physical broadcast channel, a common reference signal, a channel state information reference signal and a radio resource control information.

10. An apparatus according to claim 7, configured to time feedback information and/or grant information associated with the special subframe to coincide with another special subframe.

11. An apparatus according to claim 7, configured to allocate uplink and/or downlink subframes until a subsequent other special subframe.

12. An enhanced Node B or a mobile device comprising the apparatus according to claim 7.

13. The apparatus according to claim 7, wherein the other subframes of the radio frame that are flexibly allocated include subframes of the radio frame that are adjacent to the at least one special subframe.

14. A computer program product comprising a non-transitory computer-readable storage medium bearing computer program code embodied therein for use with a computer, the computer Program code comprising code for performing communications of a time division duplex radio frame provided with at least one special subframe comprising at least one pilot period, and comprising:
code for using the at least one special subframe for signalling of all critical control information, and
code for flexibly allocating other subframes of the radio frame than the at least one special subframe for use as downlink and uplink subframes of the radio frame such that a ratio of time periods for a downlink pilot, a guard period and an uplink pilot of the special subframe is fixed at 6:1:7 or 7:1:6.

15. The computer program product according to claim 14, wherein the other subframes of the radio frame that are flexibly allocated include subframes of the radio frame that are adjacent to the at least one special subframe.

* * * * *